United States Patent [19]

Olsen et al.

[11] 4,390,945
[45] Jun. 28, 1983

[54] SELF-MANAGING VARIABLE FIELD STORAGE STATION EMPLOYING A CURSOR FOR HANDLING NESTED DATA STRUCTURES

[75] Inventors: John D. Olsen, Escondido, Calif.;
Stephen A. Allen, Wilmington, Del.

[73] Assignee: Burroughs Corporation, Detroit, Mich.

[21] Appl. No.: 180,612

[22] Filed: Aug. 25, 1980

[51] Int. Cl.³ .............................................. G06F 7/22
[52] U.S. Cl. ..................................... 364/200; 364/900
[58] Field of Search ... 364/200 MS File, 900 MS File

[56] References Cited
U.S. PATENT DOCUMENTS

| | | | |
|---|---|---|---|
| 3,388,381 | 6/1968 | Prywes et al. | 364/200 |
| 3,596,258 | 7/1971 | Choate | 364/900 |
| 4,027,288 | 5/1977 | Barton et al. | 364/200 |
| 4,086,628 | 4/1978 | Woodrum | 364/200 |

Primary Examiner—Harvey E. Springborn
Attorney, Agent, or Firm—Mervyn L. Young; Kevin R. Peterson

[57] ABSTRACT

A variable field storage station having a control or access port and a periodic recirculating memory. A character set is employed which includes beginning delimiter and ending delimiter characters such that data in the form of structures and substructures therein can be nested to any level. One or more cursors are employed to specify storage locations between structures and substructures in which additional structures or substructures may be added. If data currently resides at that location it is read out and restored at new locations. When a structure or substructure is deleted, that space is allocated to other structures or substructures. In this manner, nested fields can be expanded or contracted as required.

3 Claims, 12 Drawing Figures

FIG. 3B ( (DATA) (DATA) ( ) )
    X      F    FXF  F

DIRECTORY

7F08 7F08 EXAMPLE 7F 00 7F 08 02 05 01 7F00 7F 08 00 7F 00 7F 08 02 05 01 7F 00 7F 20

( ( EXAMPLE ) ( 02 05 01 ) ( 00 ) ( 02 05 01 ) )

node name = "EXAMPLE"

reserved size = 010502 (hex, note that number is stored low order byte first)

type = 00 (file)

total size = 010502

FIG. 5B

STRUCTURE

7F 08 7F 08 EXAMPLE 7F 00 7F 08 02 05 01 7F 00 7F 08 00 7F 00 7F 20

( ( EXAMPLE ) ( 02 05 01 ) ( 00 ) )

SELF-MANAGING VARIABLE FIELD STORAGE STATION EMPLOYING A CURSOR FOR HANDLING NESTED DATA STRUCTURES

BACKGROUND OF THE INVENTION

1. Field of the Invention

This invention relates to a self-managing storage station employing variable length fields that can be nested to any level and more particularly to such a station under microprocessor control so that it may be employed either as a stand-alone station or in a network of one or more such stations.

2. Description of the Prior Art

Prior art storage systems have evolved as an array of identical storage cells which were arranged in a rigid manner to accommodate parallel processing. Parallel data transfer in data processing systems was employed to compensate for the relatively slow speeds of the switching elements employed in the system. Parallel data transfer, in turn, required a fixed width for data or information segments which greatly inhibited the accommodation of variable length fields and nested data structures. As a result, elaborate operating systems and other program mechanisms were created to handle the various data structures and to provide security and protection features. Some of these program mechanisms have been implemented in circuitry with some success. However, the result was still cumbersome.

Improvements in circuit components, particularly in integrated circuits, have allowed for the decentralization of the various functions in various systems and their networks. Large scale integrated circuit technology requires regularity and dedication of specialized or complex functions to circuit chips. Distribution of functions throughout a number of similar or identical integrated circuit chips can accommodate serial data transfer without an undue reduction of throughput in the system. Serial data transfer both accommodates and may be implemented in a number of new storage devices such as charge couple devices (CCD), magnetic bubble memories, and also by improvements in magnetic disk memories which have greatly enhanced access times for storage capabilities. A self-managing variable field storage system for handling nested data structures is described in the Barton and Hodgman U.S. Pat. No. 4,027,288, which system overcomes many of the above-described disadvantages. This system provides all of the following functions:

Retention of variable-length strings of symbols, up to an implementation-defined maximum;

automatic allocation and reclamation of unused storage space as strings of information increase or decrease in size;

explicit representation of the beginning and end of strings and the decomposition of strings into substrings;

access of storage strings by means of symbolic names;

storage of strings of information in ordered sets and access to them according to their order;

permission or prohibition of access to strings of information depending upon the identities of the sources of creation of those strings and which sources try to access them;

provision of optional internal representations of strings which optimize access speed by taking advantage of the physical structure of various storage media; and transmission of strings of information of variable lengths between the storage mechanism and external agencies according to a fixed discipline.

It is, then, an object of the present invention to provide a self-managing storage station that can provide many information-handling functions without the requirement of control by a central processing element.

It is another object of the present invention to provide a self-managing storage mechanism that can accommodate variable-length data segments that may be nested to any level.

It is still a further object of the present invention to provide a self-managing storage station that automatically allocates and reclaims unused storage space.

SUMMARY OF THE INVENTION

In order to accomplish the above-described object, the present invention resides in a storage station having a control or access port, which station employs a serial periodic memory as the storage mechanism. A character set is employed which includes beginning delimiter and ending delimiter characters for nesting purposes, and the data transfer is serial by character. In this manner, information structures consist of a series of substructures which can be nested to any level.

A feature then of the present invention resides in a storage station having a serial periodic memory and a port or interface control for that memory such that data structures may be stored in the form of fields which can be nested to any level.

A more specific feature of the present invention resides in the storage station having a serial periodic memory wherein fields are stored in a nested fashion, which fields can be inserted or deleted as required.

DESCRIPTION OF THE DRAWINGS

The above-described and other objects, advantages and features of the present invention will become more readily apparent from a review of the following specification when taken in conjunction with the drawings wherein.

GENERAL DESCRIPTION OF THE INVENTION

Figure 1:
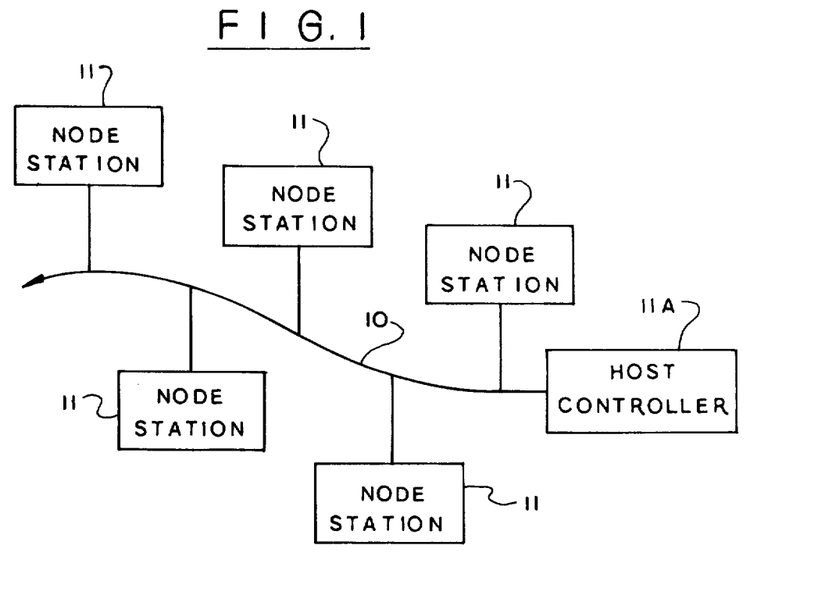
FIG. 1 is a digram of a system employing the present invention.

A system employing the present invention is illustrated in FIG. 1 which is just a network of stations 11 that are coupled together by channel 10 to form a communications network. This network may be under control of a host controller 11A. In addition, the present invention may reside in a single stand-alone station coupled to host controller.

Figure 2A:
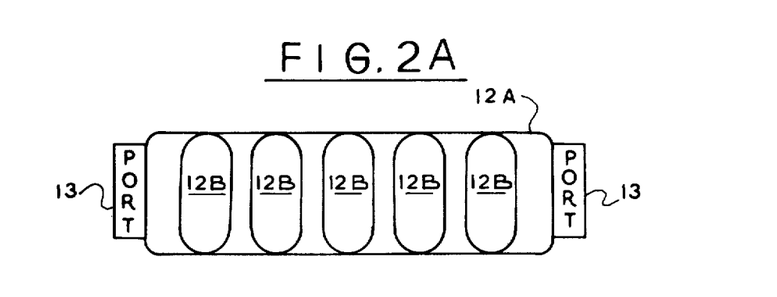
FIGS. 2A and 2B illustrate different types of periodic storage mechanisms that may be employed in the present invention.
Figure 2B:
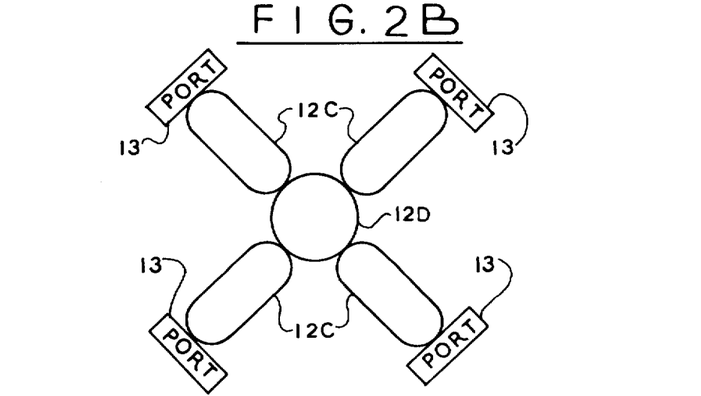

The present invention employs a serial periodic memory 12 such as shown in FIGS. 2A and 2B. Such a memory may be of a type employing charge couple devices (CCD) or magnetic bubble memories wherein data is circulated in one or more loops. For example, in FIG. 2A, the data storage is in a plurality of circular loops 12B which are accessed by one or more ports 13 by way of an outer circular loop 12A which is of the same medium as are the storage loops 12B. In FIG. 2B, data is stored primarily in a center circular loop 12D which may be accessed by a plurality of ports 13 by way of corresponding access loops 12C which again are in the same medium as in the storage loop 12D. In the embodiment of the present invention to be described, the storage medium is a circular magnetic disk, the respective tracks of which can be treated as individual storage loops or can be accessed by the port or interface controller as though it were one continuous circular storage loop.

The present invention utilizes a data format wherein certain characters are employed as delimiters to denote the beginning and ending of data segments. Such delimiters are illustrated in FIGS. 3A and 3B as being parentheses or brackets; however, it will be understood that this is for the purpose of illustration and that other forms of delimiters may be employed and in the present invention those delimiters are a specified alphanumeric character combination.

Data and information structure formats formed from this character set will now be described in relation to FIGS. 3A and 3B. The structure formats define a series of what are generally referred to as data or information cells from which fields are formed (a field may be any number of such cells or just a single cell). Certain rules of construction are to be applied to the interpretation of such a format. For example, each field will be enclosed by a beginning delimiter or bracket and an ending delimiter or bracket. Furthermore, the first information structure will begin with an adjacent pair of beginning delimiters and will end with that number of ending delimiters necessary to balance out the delimiter count as will be more thoroughly described below. In this manner, any information structure can be formed of a series of substructures that can be nested to any level. As indicated in FIGS. 3A and 3B, a complete hierarchical structure must contain the same number of ending delimiters as there are beginning delimiters. Since in a serial bit periodic store of the present invention, these structures will be scanned from left to right and it will be appreciated, that during this scan the excess of beginning delimiters over the number of ending delimiters is a measure of the level to which currently scanned substructure has been nested.

Figure 3A:
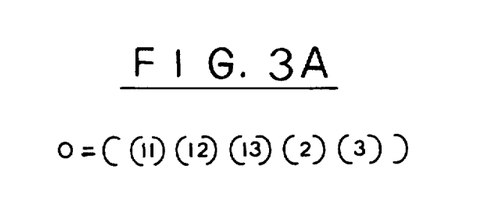
FIGS. 3A and 3B are representations of different types of information segments as employed in the present invention.
Figure 3B:
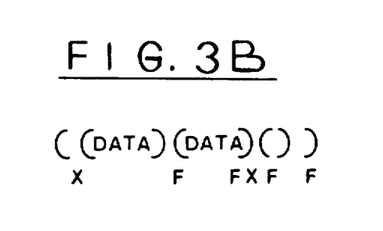

FIG. 3A illustrates the manner in which the respective subprocesses representing the overall processes can be stored in the storage mechanism of the present invention. Since the various subfields or subprocesses can be nested to any level, it will be understood that the information segment represented by FIG. 3A can be expanded up to the maximum amount of storage available in the memory.

Some additional rules of construction will now be described in relation to FIG. 3B. Data may not be stored between certain pairs of delimiters. For example, data may not be stored between a contiguous pair of opening delimiters. This is indicated in the information structure of FIG. 3B as the spaces above the X's in that Figure. Furthermore, data may not be stored between an ending delimiter and an opening delimiter. Space between an ending delimiter and an opening delimiter is considered as "free space" for further expansion of adjacent fields. Additionally, free space may exist between adjacent pairs of closing delimiters and in general after any closing delimiter. Free space is indicated in the structure of FIG. 3B as that space over the various letters F. Additional rules of construction will be further described below.

The present embodiment of the field storage model of the present invention uses a soft-sector format. A disk is divided into 35 concentric tracks and each track is partitioned into five sectors. Each sector contains 512 bytes. The present invention partitions the disk into two sections: the directory and the data base storage area. The directory is on track 0. Tracks 1–34 are used for the data base storage.

With the present invention, data is stored and maintained in a hierarchical manner. The definitions listed below are of sufficient generality that they can be applied to any hierarchical structure.

Figure 4:
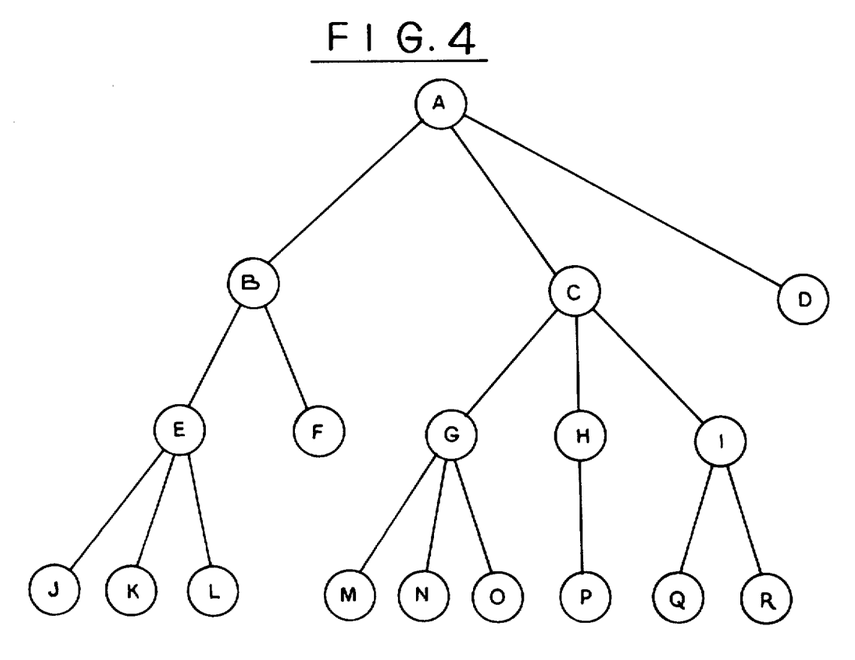
FIG. 4 is an illustration of a tree structure that may be employed to represent any series of nested data structures.

Any hierarchical structure is represented as a tree-type structure such as illustrated in FIG. 4. Each branch in the tree is referred to as a node and the uppermost node in the tree is referred to as the root node.

In FIG. 4, node A is the root node. For correspondance between the tree-type structure of FIG. 4 and the information structures of FIGS. 3A and 3B, it will be appreciated that a "node" is equivalent of an "information structure" and a subnode is the equivalent of a substructure. Thus, the overall hierarchical structures of FIGS. 3A and 3B will be represented by a root node in a graph such as shown in FIG. 4 and the inner substructures of FIGS. 3A and FIG. 3B will be represented as subnodes of the graph.

A node or structure is said to have a substructure if it has lower nodes connected to it (i.e. the structure includes substructures). A node is referred to as a subnode if it is part of the substructure of some other node. For example, in FIG. 4, node F is a subnode of node B. However, node M is not a subnode of node C although it is a subnode of node G. All or substructures of a given node or structure are referred to as brothers. In FIG. 4, nodes G, H and I are brothers. A terminal node is one without any lower level substructures.

The subnodes of any given node are considered order from the left to the right and have implied index numbers, starting with 1, associated with them, which describe the relative position within the substructure. For example, node E of FIG. 4 has the subnodes J, K and L. The index numbers of J, K and L are 1, 2 and 3, respectively. Note that the index numbers describe relative position and the index number associated with a particular node can change if the substructure is in some way altered. For example, if a new subnode is inserted into the substructure of node E, and immediately before subnode L, the new index number of subnode L would be 4, and the new subnode would have the index number 3.

A serial string is a terminal node or information structure in the hierarchical structure and is the actual data of the data base. In the present invention it is a serial variable length string of eight-bit bytes. If its length is 0, it is referred to as an empty string. A file is one of the two types of named nodes or structures used for hierarchically organizing the data base. A file can contain an arbitrary number of subnodes or substructures. If a file exists as a terminal node, it is referred to as an empty file. The subnodes of files must be strings.

A catalog is the second type of node or information structure used for hierarchically organizing the data base. It can contain an arbitrary number of subnodes or substructures. Its subnodes may be either catalogs or files or both. If a catalog exists as a terminal node, it is referred to as an empty catalog.

Certain types of information are employed in managing the data base structure of the present invention. For example, every catalog or file must have a name which is called its node name. The root node of the hierarchical structure must be a catalog and its node name is called the diskette name.

A name vector is the set of node names which describe the path which must be taken down the hierarchical structure to reach a particular catalog or file. For example, in FIG. 4, the name vector necessary to access node E is A B E, and the name vector to access node F is A B F. Not that the first name in the name vector must be the diskette name.

A name vector NV 1 is a subset of the name vector NV 2 if the complete path specified by NV 1 is a portion of the path specified by NV 2. For example, in FIG. 4, the name vector A C is a subset of the name vector A C G, but the name vector A C G is not a subset of the name vector A C H. Note that the name vector A C G is subset of the name vector A C G.

A cursor is a pointer used to identify positions within the substructure of the catalog or file to which it is assigned. Thus, the cursor is an address to a storage location. It identifies positions between subnodes. A cursor name is a user-specified identifier assigned to a cursor at the time it is established. The position of a cursor is described in terms of subnodes. Reading left to right, a cursor or addressed storage location is positioned at the ith subnode or substructures when the subnode with the index number i is immediately to the cursor's right. A cursor or addressed storage location is positioned at the beginning of a catalog or file when there are no subnodes or substructures to the cursor's right. A cursor's position has been incremented if its old position was at the ith subnode and its new position is at the (i+1)th subnode, or at the end.

Storage space allocation among nodes is managed hierarchically by the system of the present invention, and there is no limit imposed on the amount of space a node may consume. There is only the obvious limit that the total space consumed by all nodes cannot exceed the capacity of the file medium. Hierarchical space management means that space allocated to a node or information structure can be distributed among the node's subnodes or substructures, which in turn can distribute space to their subnodes, and so on. Furthermore, space that becomes unused at a node can be passed to nodes above it in the tree. For example, in FIG. 4, space that has been allocated to node C is available for allocation to nodes G, H and I, which in turn can allocate portions of that space to their subnodes. If node M were deleted, the space it had consumed could be allocated to node G where it would be available for node N, or any new subnode of node G.

Nodes or structures are permitted to expand and contract as needed and space is accumulated where it is needed. The situation may occur, however, where in order to allocate space required by a node, the system of the present invention may have to readjust the way the space is distributed throughout the hierarchy. A user may tailor the space allocation in a way that best suits his particular application, thereby increasing the efficiency of the allocation process and reducing the probability of the space distribution readjustment.

The manner in which the space is allocated among the various nodes or information structures can be described by the following terminology. The total amount of space assigned to a node is referred to as the allocated space. An empty string consumes four bytes of data base storage area. In the present embodiment being described, an empty file or catalog consumes overhead space in the directory as well as the data base storage area as follows: 31 bytes plus the number of characters in its name in the directory, and 24 bytes plus the number of characters in its name in the data base storage area.

Unused space is space which has been allocated to a node but has not yet been consumed by the node or its subnodes. Used space is the space consumed by the node as overhead plus the space currently allocated to its subnodes. Reserved minimum space is a user-specified quantity designating the space the user wants the system of the present invention to guarantee as a minimum allocation to a catalog or file, whether the node uses it or not. It should be noted, however, this space is not a maximum limit on the allocation which may accumulate at the node.

To delimit information on the disk, special characters called structure marks are used. These structure marks appear as character pairs. The first character is always the ASCII "del" (hex=7F). The second character of the pair is context dependent.

In general, storage algorithms scan the disk for these marks and make decisions when they are encountered. If the data being stored on the disk contains a "del," the algorithms insert a second "del" after it. Thus, a hex 7F followed by anything but a 7F is a structure mark. A hex 7F followed by a second hex 7F is interpreted as a single valid hex 7F character of data.

All of the following structure marks are preceded by hex 7F.

| HEX VALUE | NAME | USE |
| --- | --- | --- |
| 00 | End of String | End of string |
|  | End of Subfield | End of a subfield (in a desc. field) |
| 08 | Start of String | Start of a string |
|  | Start of Subfield | Start of a subfield (in a desc. field) |
| 10 | End of File | End of a catalog or file |
| 18 | Start of File | Start of a catalog or file |
| 20 | End Description Field | End of description field mark |

Every catalog and file contained on the diskette has an information field associated with it called a "description field." An important principle of the storage architecture is that all information about a file or catalog is to be stored with that file or catalog in the structure. (This makes the directory completely redundant, except for such things as access optimization, etc.). This information is stored at the beginning of the catalog or file in the description field.

Two versions of the description field exist for each catalog or file: one appears in the structure, the other in the directory. The directory description field contains the following subfields:

node name
reserve size
node type
total size

Figure 5A:
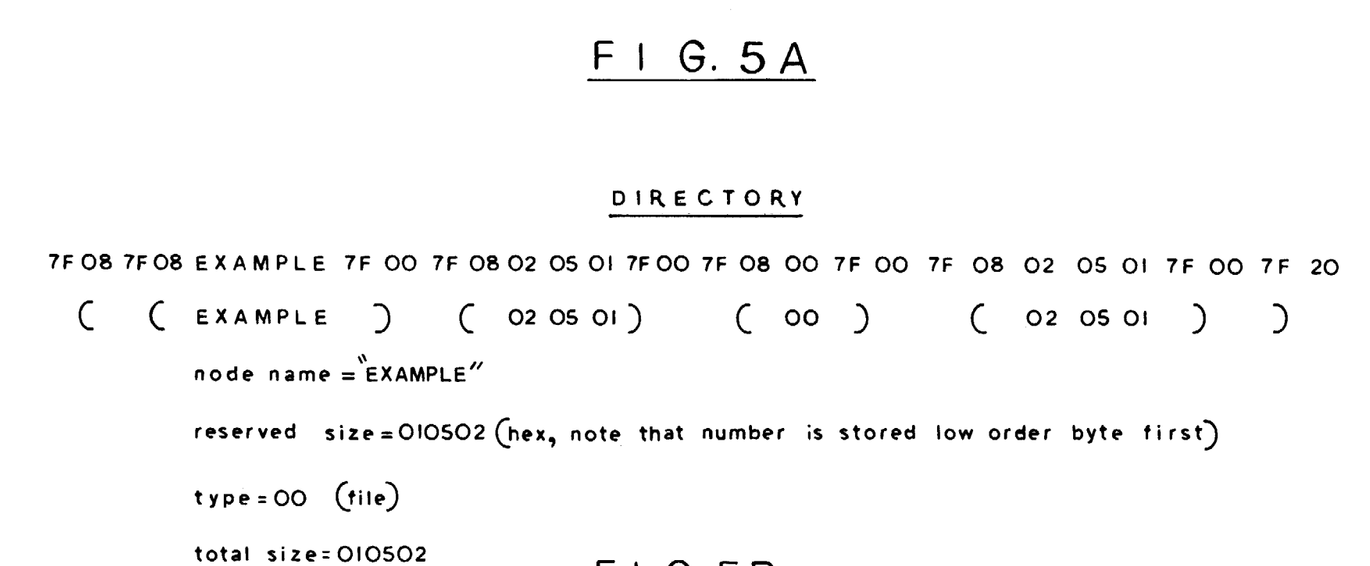
FIGS. 5A and 5B are representations of special types of information segments employed in the present invention.
Figure 5B:
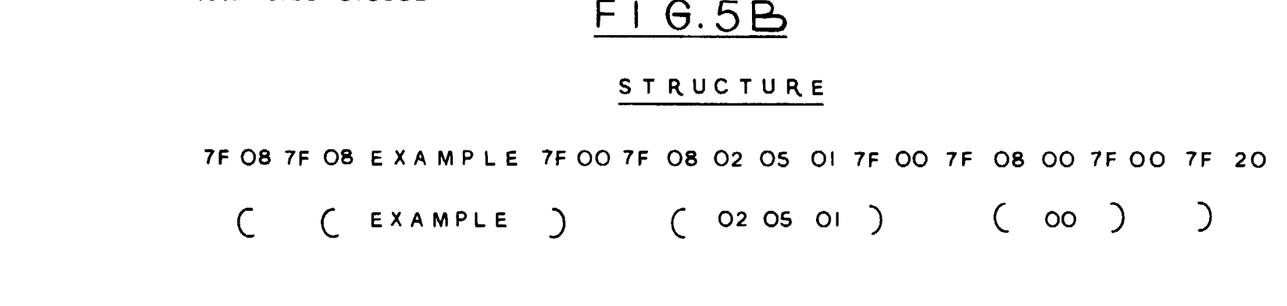

The structure description field is identical except it does not contain a total size field. The exact contents of both types of description fields is shown in FIGS. 5A and B. These Figures also show the equivalent fields using the parenthesized notation. Note that structure marks must always be balanced, and that description fields end with a "7F 20" character sequence.

DETAILED DESCRIPTION OF THE INVENTION

Figure 6A:
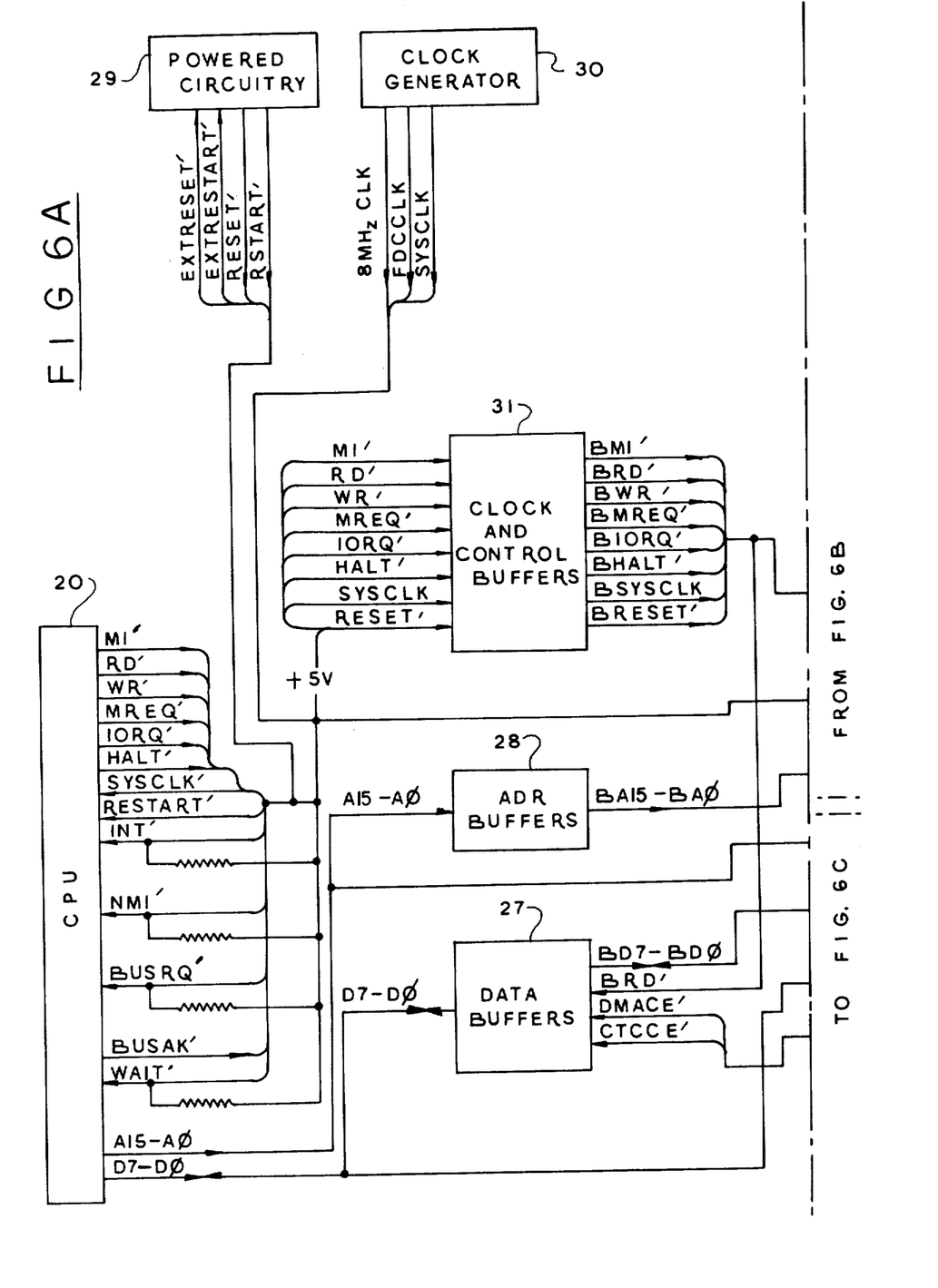
FIGS. 6A, B and C are schematic representations of the control and access interface as employed in the present invention.
Figure 6B:
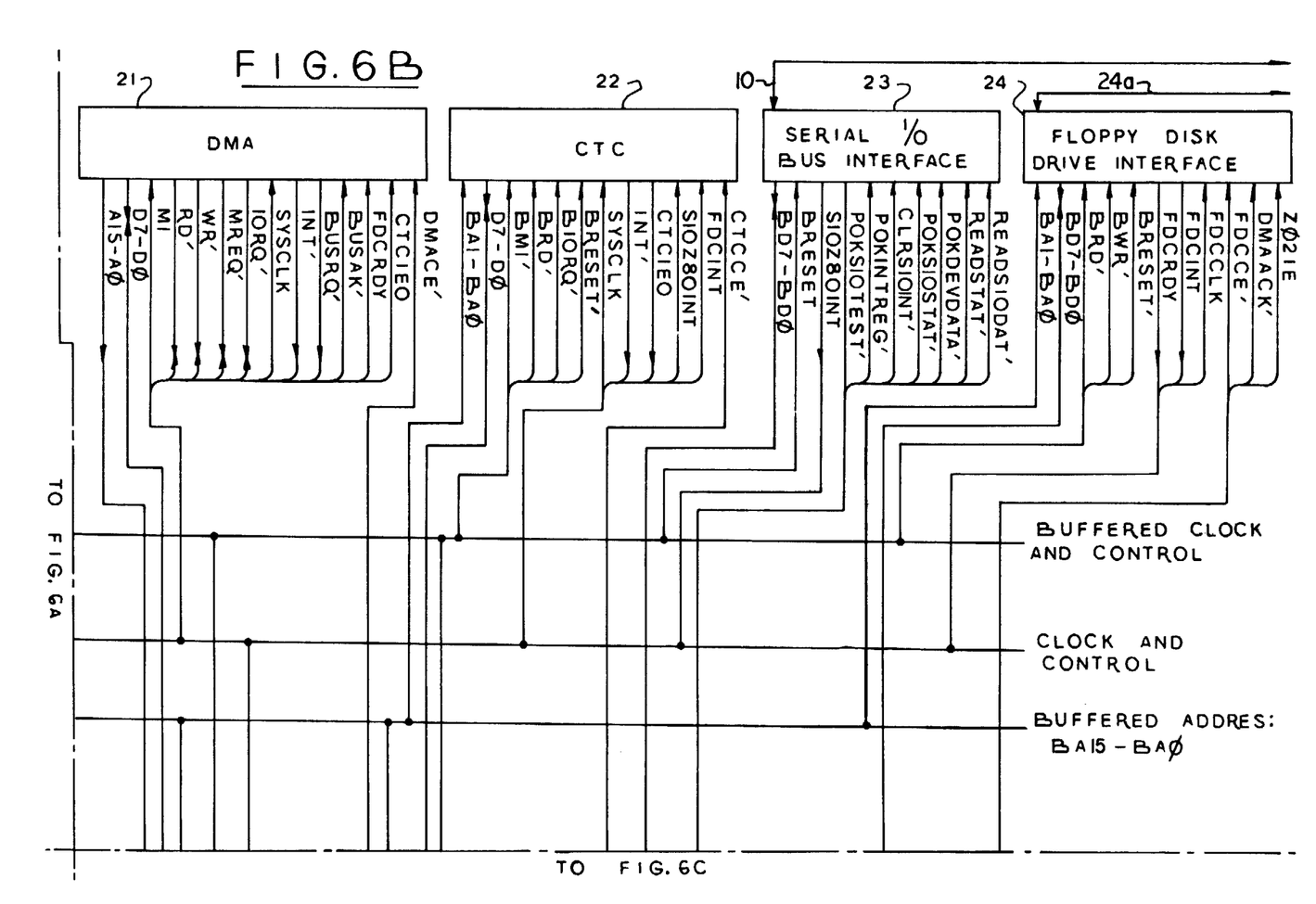
Figure 6C:
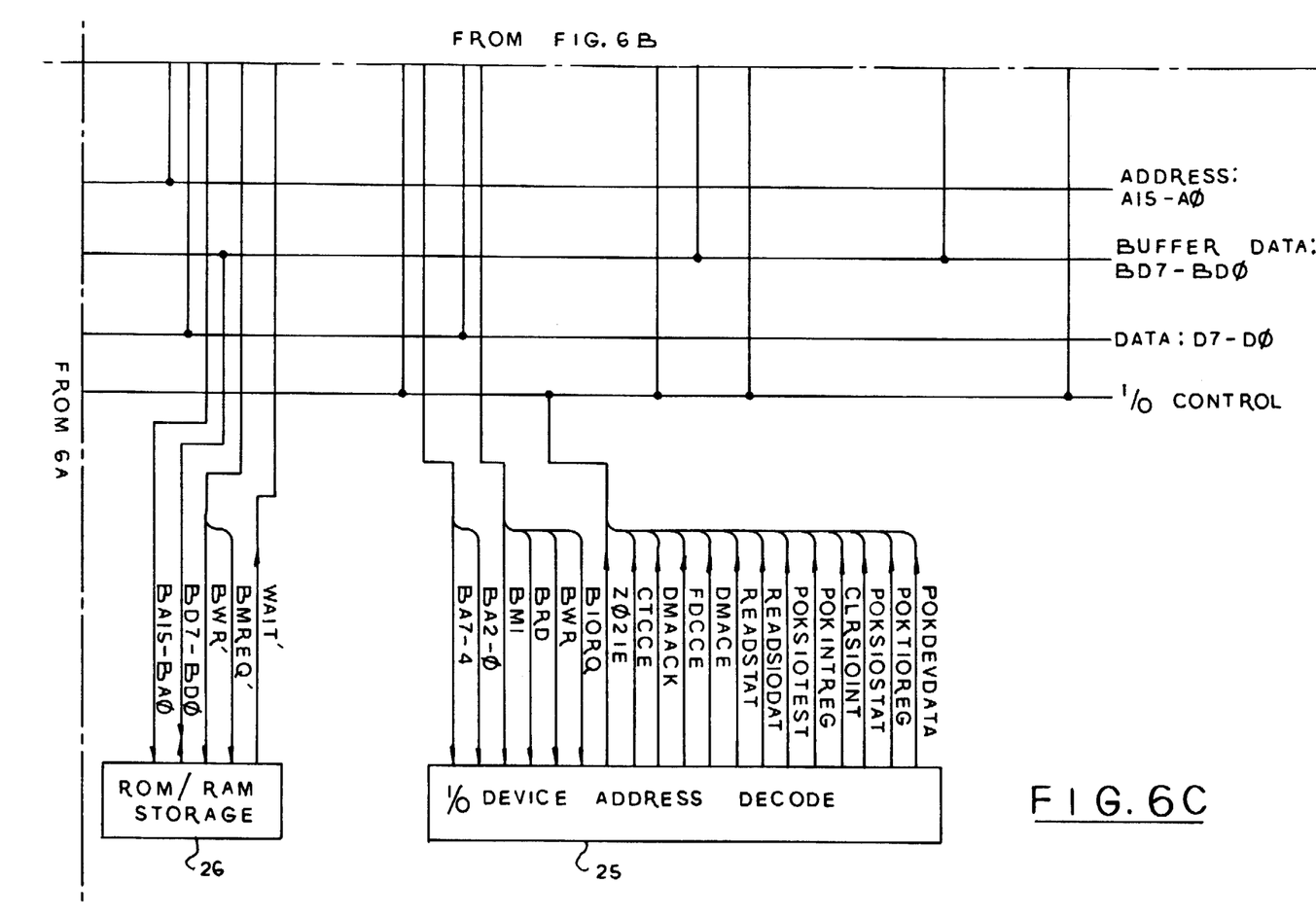

The control and access interface employed in the present invention is illustrated in FIGS. 6A, 6B and 6C. This interface serves to provide all the functions required for not only the maintenance of the storage file but also for the transfer of data to and from that file. In the latter sense, FIGS. 6A, 6B and 6C represent the dynamic memory interface for communication between the file and the outside world. As illustrated in FIG. 6A, this interface includes processor 20 which, as mentioned above, controls file maintenance. In FIG. 6B, control information and data are received from external sources by way of I/O bus 10 to serial I/O bus interface 23 and supplied to the disk drive interface 24 by way of disc bus 24a. In addition, data can be transferred from the I/O bus to the disk and back by way of direct memory access control 21 which will be more thoroughly described below. In FIG. 6C, I/O device addresses are decoded by I/O device address decode 25. Clock and control signals are provided by way of clock and control buffers 31 in FIG. 6A which are driven by processor 20 under control of clock signals provided by clock generator 30. In addition, buffer storage is provided in the interface by a ROM/RAM storage 26 under control of a ROM/RAM storage interface of FIG. 6C.

ROM/RAM storage 26 and its control includes wait state generation logic to generate a WAIT state each time a memory access occurs on the processor system bus. Either processor 20 of FIG. 6A or direct memory access controller (DMA) 21 of FIG. 6B can initiate memory cycles. In addition, storage control 26 decodes the state of the system bus address lines in order to select the appropriate ROM or RAM memory.

Direct memory access controller (DMA) 21 provides the capability of transferring data to and from the disk memory without processor intervention. This access controller is not required, however, as it is possible to transfer data to and from the disk under processor control; but during the time of transfer, the processor would be dedicated to that task. The direct memory access controller offers the opportunity to achieve some concurrent processing.

Clock timer circuitry (CTC) 22 of FIG. 6B is employed for two separate functions. One function is the provision of vectored interrupt capability for the disk interface, and the serial I/O bus interface 23. This is accomplished by using one of a plurality of counter/timer channels for the disk interrupt and one of the channels for the serial I/O interrupt. The appropriate channel must be configured under firmware control to count external events, and to interrupt after counting one occurrence of the external event. The other channel is employed in a similar fashion for the serial I/O bus interface logic. The second function of the clock timer circuitry is to act as a real time clock. This is accomplished by using two other or the circuitry's channels where one channel is configured to run in a time mode and the other channel is configured to run in an external event counting mode. In this manner, one channel can be made to count the number of times the other channel reaches a zero count. The channels can then be configured to interrupt on any desired condition. Such a real time clock has an accuracy which is a function of the system clock.

Disk interface 24 can drive one or more disk memories by way of disc bus 24a. The interface can be partitioned into five sections as will now be described. An interface control portion provides all the control function necessary to interface to the disk memory. It consists of a disk controller and a register, both of which are accessed with input and output instructions from processor 20. The four-bit register exists only to offer some control signals not supplied by the disk controller and to furnish drive selection signals which are provided by the disk controller but do not work in a desirable fashion when dealing with the particular disk memory. The disk controller can operate under control either of processor 20 or direct memory access controller 21. Under control of processor 20, all data transfers are to and from the disk controller of disk interface 24. When control is under control of direct memory access control 21, the data transfer is at the byte level without processor intervention.

In addition, disk interface 24 implements data and clock separation, as well as address mark detection. To accomplish this, it requires an input signal called DATA WINDOW. This signal must be derived from the composite data received from the disk memory. The particular circuitry which sources the DATA WINDOW signal is dependent upon the type of disk drive being employed.

Serial I/O bus interface 23 cooperates with processor 20 to implement the particular protocols required for data transfer on the serial I/O bus. Interface 23 does not implement these protocols independently, however, as the processor 20 must compute the blocked check character for block transfers. Interface 23 is a synchronous circuit which employs a clock signal derived from one of two sources. The clock line on the serial I/O bus itself is the normal source. A second source is the self-testing circuitry (not shown). Interface 23 provides two data paths, one for data out and the second to receive data from the serial I/O bus. This data is either the data actually on the bus or data used to self-test the interface circuitry. I/O device decode 25 provides all the device addresses to which the I/O devices respond.

Figure 7:
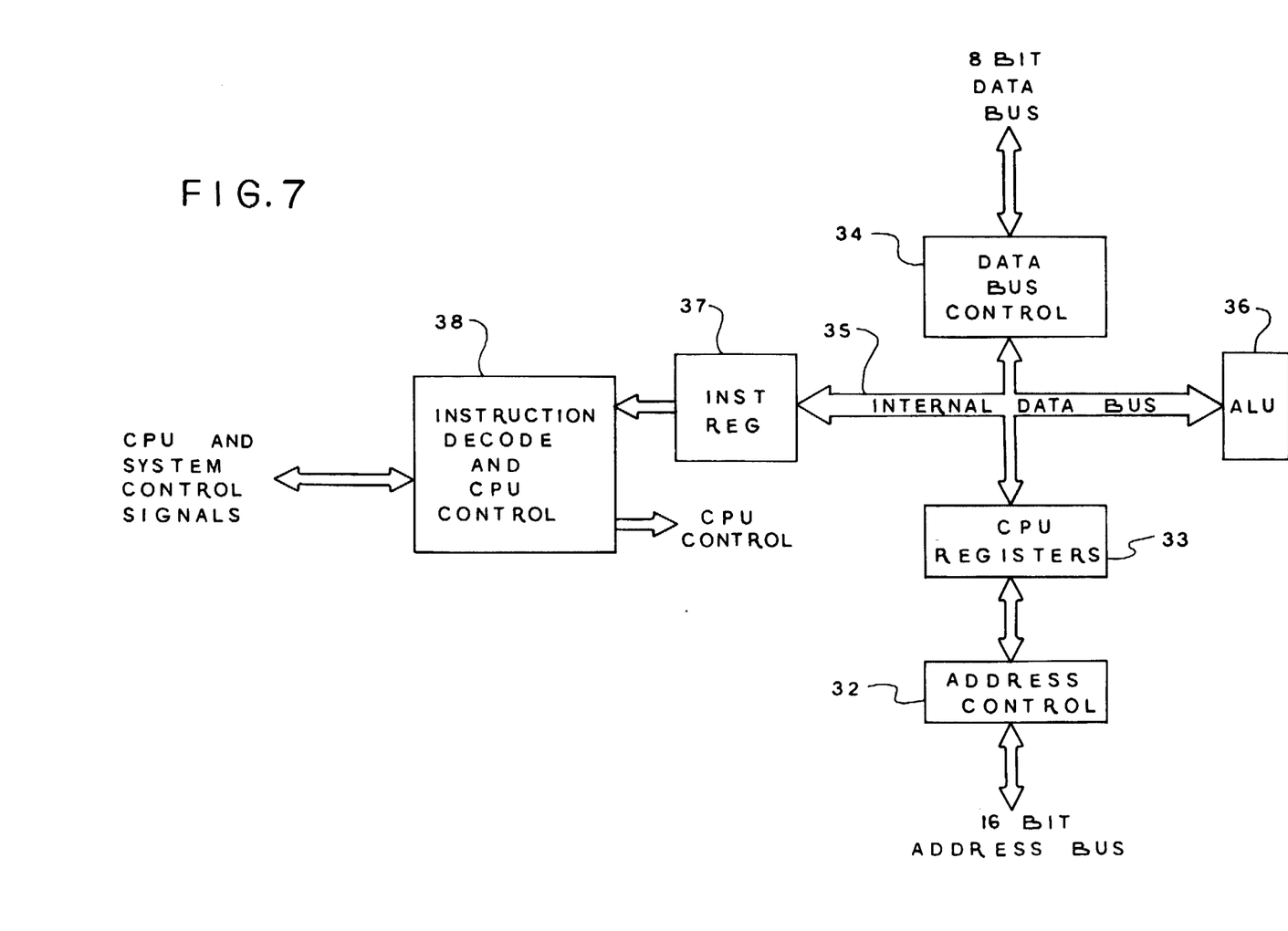
FIG. 7 is a schematic representation of the processor of FIG. 6A.

The organization of processor 20 of FIG. 6A is illustrated in FIG. 7. Direct memory access controller 21 of FIG. 6B is also of this type of processor. As indicated therein, eight-bit data segments are received by data bus control 34 for transfer by way of internal data bus 35 to processor or CPU registers 33. Sixteen-bit address segments are received by address control 32 and transferred to registers 33. In the maintenance of the storage files in the present invention, data segments are retrieved from the disk memory for transfer to registers 33. The respective comparisons that are required to detect the various delimiters described above are performed by arithmetic logic unit (ALU) 36. Control of the system is by way of instruction decode and processor or CPU control 38 which decodes instructions received from instruction register 37. The processor or CPU of FIGS. 6A and 7 may be a commercially available processor such as a Zilog Z80 microprocessor as described in Microcomputer Components Data Book, February 1980, Copyrighted 1979, 1980 by Zilog Company, Inc.

EPILOGUE

A storage station has been described which employs a serial periodic memory as the storage mechanism and also employs a character set which includes a beginning delimiter character and an ending delimiter character such that information structures can be formed from a series of substructures that can be nested to any level.

While but one embodiment of the present invention has been described, it will be apparent to those skilled in the art that modifications and variations may be made without departing from the spirit and scope of the invention as claimed.

What is claimed is:

1. A variable field storage system for storing variable length data field segments including information structures having substructures nested therein, each such structure starting with a beginning delimiter character and ending with an ending delimiter character, said structures and substructures being capable of being nested to any level as determined by the number of beginning delimiter characters previously not matched by ending delimiter characters during a scanning of the stored field segments, said system comprising:

a serial periodic storage medium;

access means coupled to said storage medium for supplying at least data to said storage medium in a sequence of structures and substructures;

said access means including cursor address means for containing addresses specifying particular locations in the storage medium, said access means serving to supply a new data segment representing a structure or substructure at a location specified by said cursor address means.

2. In a variable field storage system for storing variable length data field segments, each of which starts with a beginning delimiter character and ends with an ending delimiter character, said segments being capable of being nested to any level as determined by the number of beginning delimiter characters previously not matched by ending delimiter characters during a scanning of the stored field segments, said system including a serial periodic storage medium and access means, said access means including cursor address means to specify particular locations in said storage medium, the method comprising:

supplying said data segments to said storage medium in a sequence of structures and substructures, each of which starts with a beginning delimiter character and ending with an ending delimiter character; and supplying certain of said data segments at locations specified by said cursor address means.

3. In a variable field storage system storing variable length data field segments, each of which starts with a beginning delimiter character and ends with an ending delimiter character, said segments being capable of being nested to any level as determined by the number of beginning delimiter characters previously not matched by ending delimiter characters during the scanning of a stored field segments, said system including a serial periodic storage medium and access means, said access means including cursor address means to specify particular locations in said storage medium, the method comprising:

supplying data to said storage medium in a sequence of structures and substructures, each of which starts with a beginning delimiter character and ending with an ending delimiter character; and receiving data representing a structure or substructure from a location specified by said cursor access means.

* * * * *